United States Patent Office 2,819,248
Patented Jan. 7, 1958

2,819,248

UNSATURATED POLYESTER ROOM TEMPERATURE SETTING ADHESIVE COMPOSITION

George S. Casebolt, Summit, N. J., assignor to American Cyanamid Company, New York, N. Y., a corporation of Maine No Drawing. Application February 15, 1954
Serial No. 410,420

4 Claims. (Cl. 260—45.4)

This invention relates to the production of adhesive compositions. More particularly this invention relates to the production of adhesive compositions wherein a polymerizable unsaturated polyester, a monomeric compound polymerizable therewith and a polyvinyl ingredient selected from the group consisting of polyvinyl acetate and polyvinyl acetal are combined. Further this invention relates to the production of the adhesive compositions, the adhesives produced and the employment of said adhesive compositions.

Polymerizable unsaturated polyester resinous compositions are well known in the art and find many uses in the laminating and molding resin field. However, these resins have not been successfully employed as adhesives inasmuch as they do not bond well to vapor impervious surfaces.

It is an object of my invention to prepare adhesive compositions. It is a further object of my invention to prepare adhesive compositions utilizing polymerizable unsaturated polyesters. These and other objects of my invention will be discussed more fully hereinbelow.

I have now found that an adhesive composition may be prepared by combining a polymerizable unsaturated polyester resin with a polyvinyl acetate or acetal resin to obtain a composition possessing good metal bonding properties and also thermosetting properties. The addition of from about 2% to about 20% by weight based on the total weight of polyvinyl acetate or polyvinyl acetal to the polymerizable unsaturated polyester, greatly improves the quality of the bond of these compositions to such materials as metals to wood, metal to metal, wood to wood, metal to glass, etc. Generally it is preferred that about 5% by weight of the polyvinyl acetate or acetal be present in the adhesive composition although in certain instances the percentage may be as large as 15%. I have found that when the polyvinyl acetate or acetal is present in an amount over about 20% by weight the adhesive properties of the composition do not materially improve and for this reason it is not recommended to employ an amount greater than this. Any polyvinyl acetate may be used in the preparation of the adhesive composition of my invention. There are a number of methods of preparing these polymers, all of which are well known in the art, and it is immaterial which method is selected for the preparation thereof. Representative of the processes are those set forth in U. S. Patents Nos. 2,388,600, 2,388,602 and 2,398,344. The polyvinyl acetal employed in the preparation of the adhesive composition is also well known in the art and it is immaterial which method is selected for the preparation thereof. Representative examples of the process for preparing the polyvinyl acetal herein employed are set forth in U. S. Patents Nos. 2,036,092 and 2,168,827.

In preparing the polymerizable unsaturated polyester resin utilized in my invention, one may make use of the ethylenically unsaturated polycarboxylic acids such as maleic, fumaric, aconitic, itaconic, and the like. The ethylenically unsaturated polycarboxylic acids include those known as the alpha, beta unsaturated acids. These unsaturated acids should be present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, i. e., those which are free of non-benzenoid unsaturation, one could use such acids as phthalic, malonic, succinic, glutaric, sebacic, and the like, but in amounts less than a larger proportion of the total amount of polycarboxylic acid present. Whenever available, the anhydrides of these acids may be used, e. g., maleic anhydride, phthalic anhydride, and as used herein polycarboxylic acids include the polycarboxylic anhydrides when available. Also, mixtures of the acids and anhydrides may be used in the preparation of the polyester resin.

As polyhydric alcohols which may be used in the preparation of the polymerizable unsaturated polyesters of the present invention, it is preferred that those alcohols containing only two hydroxy groups be used. However, those alcohols containing three hydroxy groups, four hydroxy groups, or more hydroxy groups may be used in minor amounts. Illustrative examples of the various dihydroxy alcohols that find employment in our invention are: ethylene glycol; diethylene glycol; propylene glycol; dipropylene glycol; butanediol-1,4; butanediol-1,3; butanediol-1,2; pentanediol-1,4; pentanediol-1,5; hexanediol-1,6; and the like. Additionally, such polyhydric alcohols as glycerol, 1-1'-isopropylidenebis(p-phenylenoxy)di-2-propanol, pentaerythritol, dipentaerythritol, and the like may be used in our invention.

In the preparation of the polymerizable unsaturated polyesters, one may use the polyhydric alcohols and the polycarboxylic acids in a proportion substantially equally about mol for mol and preferably an excess of alcohol approximating 10% above the stoichiometric quantity required for complete esterification. If polyhydric alcohols containing more than two hydroxy groups are used, calculation of the molar proportion should be made on a stoichiometric basis so as to make allowance for the additional hydroxy groups such as those found in glycerol, pentaerythritol and the like. This is also true when polycarboxylic acids having more than two carboxyl groups are employed. A sufficient quantity of the alcohol and acid should be reacted so as to produce an ultimate polyester resinous material having an acid number not greater than about 55 and, preferably, an acid number from about 35 to 40. The polymerizable unsaturated polyesters are admixed with a monomeric compound containing the polymerizable $CH_2=C<$ group to give a composition that may be cured to a stable thermoset condition. One may use from about 10 parts by weight of the monomeric material to about 90 parts of the unsaturated polyester resin up to about 80 parts of the monomeric material to about 20 parts of the polymerized unsaturated polyester resin. The preferred embodiment, however, is to use from about 25 parts of the monomeric material to about 35 parts of the monomeric material with about 75 parts to about 65 parts, respectively, of the polymerizable unsaturated polyester resin.

The monomeric material containing the polymerizable $CH_2=C<$ group has a boiling point of at least 60° C. Among the polymerizable monomeric materials that may find use in our invention are such as styrene, side-chain alkyl and halo substituted styrenes such as alpha-methylstyrene, alpha-chlorostyrene, alpha-ethylstyrene and the like or alkyl and halo ring-substituted styrene such as o-, m- and p-alkyl styrenes such as o-methylstyrene, p-ethylstyrene, m-propylstyrene, 2,4-dimethylstyrene, 2,5-diethylstyrene, bromostyrene, chlorostyrene, dichlorostyrene, and the like.

In the formulation of the adhesive compositions of my invention, it is necessary that a catalyst be present to effect the polymerization of the unsaturated polyester resin and the monomeric material containing the polymerizable $CH_2=C<$ group. It is preferred, as is well known in the art, that a catalyst of the peroxide class be utilized. The amount of the catalyst employed may vary over rather wide limits to give varying catalyzed stability. Thus, from about 0.1% to about 10% by weight based on the total weight of the polymerizable composition may be used. Preferably, from about 0.05% to about 1.0% by weight of the catalyst based on the total weight of the polymerizable resinous composition gives the desired results. It is obvious that other proportions of the catalyst may be utilized when a faster or slower rate of cure is desired. Examples of the organic peroxide catalyst that may be used in my invention are such as benzoyl peroxide, succinyl peroxide, acetyl peroxide, methylethyl ketone peroxide, cumene hydroperoxide, tertiarybutyl hydroperoxide, cyclohexanone peroxide, perbenzoic acid, peracetic acid, anisoyl peroxide, toluyl peroxide, p-bromobenzoyl peroxide, tertiarybutyl perbenzoate, p-methane hydroperoxide, pinane hydroperoxide, diisopropylbenzene hydroperoxide, 1-cyclohexanol-1-hydroperoxide, furoyl peroxide and chloracetyl peroxide or any organic ozonide, such as diisopropylene ozonide, diisobutylene ozonide, or a mixture of such substances may be used as the curing catalyst.

It is advantageous to add a moderate amount of inhibiting agent to the composition. The amount of inhibiting agent used is that required to give a minimum storage stability to the uncatalyzed mixture. Examples of inhibiting agents that may be used in our invention are such as hydroquinone, pyrogallol, tannic acid, tertiarybutyl catechol, or an organic amine such as aniline or phenylene diamine. Mixtures of the inhibiting agents may also be used if desired. About 0.008% of inhibiting agent by weight, based on the total weight of the resinous composition, usually gives satisfactory results.

In order that those skilled in the art may more fully understand the inventive concept herein presented, the following examples are given by way of illustration and not limitation unless so noted in the appended claims. All parts are parts by weight.

RESIN A

A polymerizable unsaturated polyester was prepared by reacting 6.6 mols of propylene glycol, 4.0 mols of phthalic anhydride and 2.0 mols of fumaric acid under an inert atmosphere of carbon dioxide and at an elevated temperature until an acid number from between 35 and 40 was obtained. 60 parts of the polyester were then combined with 40 parts of styrene.

RESIN B

A polymerizable unsaturated polyester was prepared by reacting 6.6 mols of propylene glycol, 4.0 mols of maleic anhydride and 2.0 mols of phthalic acid under an inert atmosphere and at an elevated temperature until an acid number of between 35 and 40 was obtained. Two parts of the polyester were then combined with one part of styrene.

The procedure set forth above in the preparation of the polymerizable unsaturated polyester was repeated except that methylstyrene was substituted for styrene.

The adhesive composition of my invention was then prepared by dissolving a predetermined amount of polyvinyl acetate or polyvinyl acetal in a suitable solvent such as acetone. This solution was then added to the desired quantity of polyester resin. After the components of the adhesive had been stirred to uniformity, the material was then heated on a steam bath until all of the solvent for the polyvinyl acetate or acetal had been boiled off. Upon the addition of the desired amount of catalyst, an adhesive composition ready for use was thus produced. Set forth below are the results obtained when aluminum test strips were united with the adhesive composition.

Table 1

| Polyester Resin | Amount (Parts) | Vinyl Resin | Amount (Parts) | Shear Strength [1] (p. s. i.) 2-Day Cure | Shear Strength [1] (p. s. i.) 5-Day Cure |
|---|---|---|---|---|---|
| Resin A | 100 | None | | 55 | 65 |
| Do | 100 | Polyvinyl Acetate | 5 | 330 | 290 |
| Do | 100 | ...do... | 5 | 510 | 375 |
| Resin B | 100 | None | | 50 | 20 |
| Do | 100 | Polyvinyl Acetate | 5 | 240 | |
| Do | 100 | ...do... | 5 | 270 | 320 |

[1] Shear strength reported is average of two test pieces.

Each of the bonds produced in the table set forth above was effected at room temperature cure. Inasmuch as the bonds produced at elevated temperature are not as strong as those produced at room temperature cure, it is preferred that the adhesive composition be employed at room temperature. The development of a strong bond at room temperature cure is another outstanding example of the utility of the adhesive composition of my invention. The exact mechanism whereby the adhesive composition herein described and claimed is formed is not fully understood. However, it is believed that the polyvinyl acetate or acetal present is chemically cross-linked during the room temperature cure of the adhesive so that a thermoset structure is obtained.

I claim:

1. A room temperature setting adhesive composition consisting of a polymerizable ethylenically unsaturated linear polyhydric alcohol-polycarboxylic acid polyester, styrene, a polymerization catalyst of the group consisting of organic peroxides and organic ozonides, and between about 2 and about 20% by weight of an ingredient of the group consisting of polyvinyl acetate and polyvinyl acetal.

2. A composition according to claim 1 which contains between about 5 and about 15% by weight of the polyvinyl ingredient.

3. A composition of matter according to claim 1 in which said ingredient is polyvinyl acetate.

4. A composition of matter according to claim 1 in which said ingredient is polyvinyl acetal.

References Cited in the file of this patent

UNITED STATES PATENTS

| | | |
|---|---|---|
| 2,332,898 | D'Alelio | Oct. 26, 1943 |
| 2,343,091 | Smith | Feb. 29, 1944 |
| 2,528,235 | Loritsch | Oct. 31, 1950 |
| 2,567,719 | Loritsch et al. | Sept. 11, 1951 |
| 2,642,403 | Simon et al. | June 16, 1953 |

OTHER REFERENCES

Delmonte: The Technology of Adhesives, page 111, published by Reinhold Pub. Corp., New York, 1947.